United States Patent
Goh et al.

(10) Patent No.: US 12,314,488 B2
(45) Date of Patent: May 27, 2025

(54) SYSTEM AND METHOD FOR A QUIET MOUSE SCROLL WHEEL WITH MAGNETIC HAPTIC ENCODER

(71) Applicant: Dell Products, LP, Round Rock, TX (US)

(72) Inventors: Peng Lip Goh, Singapore (SG); Deeder M. Aurongzeb, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 18/385,825

(22) Filed: Oct. 31, 2023

(65) Prior Publication Data
US 2025/0138651 A1    May 1, 2025

(51) Int. Cl.
G06F 3/0354 (2013.01)
G06F 3/01 (2006.01)
G06F 3/0362 (2013.01)

(52) U.S. Cl.
CPC .......... G06F 3/03543 (2013.01); G06F 3/016 (2013.01); G06F 3/0362 (2013.01)

(58) Field of Classification Search
CPC ..... G06F 3/016; G06F 3/03545; G06F 3/0362
See application file for complete search history.

(56) References Cited

U.S. PATENT DOCUMENTS

| | | |
|---|---|---|
| 9,778,760 B1 | 10/2017 | Huang |
| 10,444,872 B2 | 10/2019 | Hsueh |
| 11,009,973 B1 | 5/2021 | Goh |
| 11,099,667 B1 * | 8/2021 | Cheng ................ G06F 3/0362 |
| 11,681,379 B1 * | 6/2023 | Su ...................... G06F 3/016 345/163 |
| 11,797,108 B1 * | 10/2023 | Su ...................... G06F 3/03543 |
| 11,907,441 B1 * | 2/2024 | Goh .................... G10K 11/16 |
| 11,907,443 B1 * | 2/2024 | Goh .................... G06F 3/165 |
| 11,907,444 B1 * | 2/2024 | Goh .................... G06F 3/0383 |
| 11,972,066 B2 * | 4/2024 | Goh .................... G06F 3/016 |
| 12,039,114 B1 * | 7/2024 | Su ...................... G06F 3/03543 |
| 2006/0001657 A1 | 1/2006 | Monney |
| 2006/0109246 A1 | 5/2006 | Lee |
| 2009/0079693 A1 | 3/2009 | Monney |
| 2009/0079711 A1 | 3/2009 | Monney |
| 2009/0096750 A1 | 4/2009 | Lee |
| 2016/0041633 A1 | 2/2016 | Weng |
| 2016/0282969 A1 | 9/2016 | Young |
| 2023/0341956 A1 | 10/2023 | Rizvi |

(Continued)

*Primary Examiner* — Michael Pervan
(74) *Attorney, Agent, or Firm* — Prol Intellectual Property Law, PLLC; H. Kenneth Prol

(57) ABSTRACT

A mouse for use with an information handling system comprising a base chassis of the mouse to enclose a mouse microcontroller and a mouse power management unit (PMU) to power the mouse microcontroller, a scroll wheel to receive scrolling input from a user from scroll wheel rotation and a magnetic haptic encoder detecting scrolling input and comprising a grooved ferromagnetic wheel with alternating wheel grooved portions and wheel raised portions for rotating by a magnet such that rotation of the alternating wheel grooved portions and wheel raised portions adjacent to the magnet generate haptic feedback at the scroll wheel for the user and a top housing operatively coupled to the base chassis of the mouse to enclose the mouse.

20 Claims, 6 Drawing Sheets

(56) References Cited

U.S. PATENT DOCUMENTS

| | | | |
|---|---|---|---|
| 2024/0036654 A1* | 2/2024 | Goh | G06F 3/021 |
| 2024/0036661 A1* | 2/2024 | Goh | G06F 3/0362 |
| 2024/0036662 A1* | 2/2024 | Goh | G06F 3/03543 |
| 2024/0036663 A1* | 2/2024 | Goh | G06F 3/03543 |
| 2024/0036664 A1* | 2/2024 | Goh | G06F 3/0219 |
| 2024/0036665 A1* | 2/2024 | Goh | H03K 17/97 |
| 2024/0036666 A1* | 2/2024 | Goh | G06F 1/26 |

\* cited by examiner

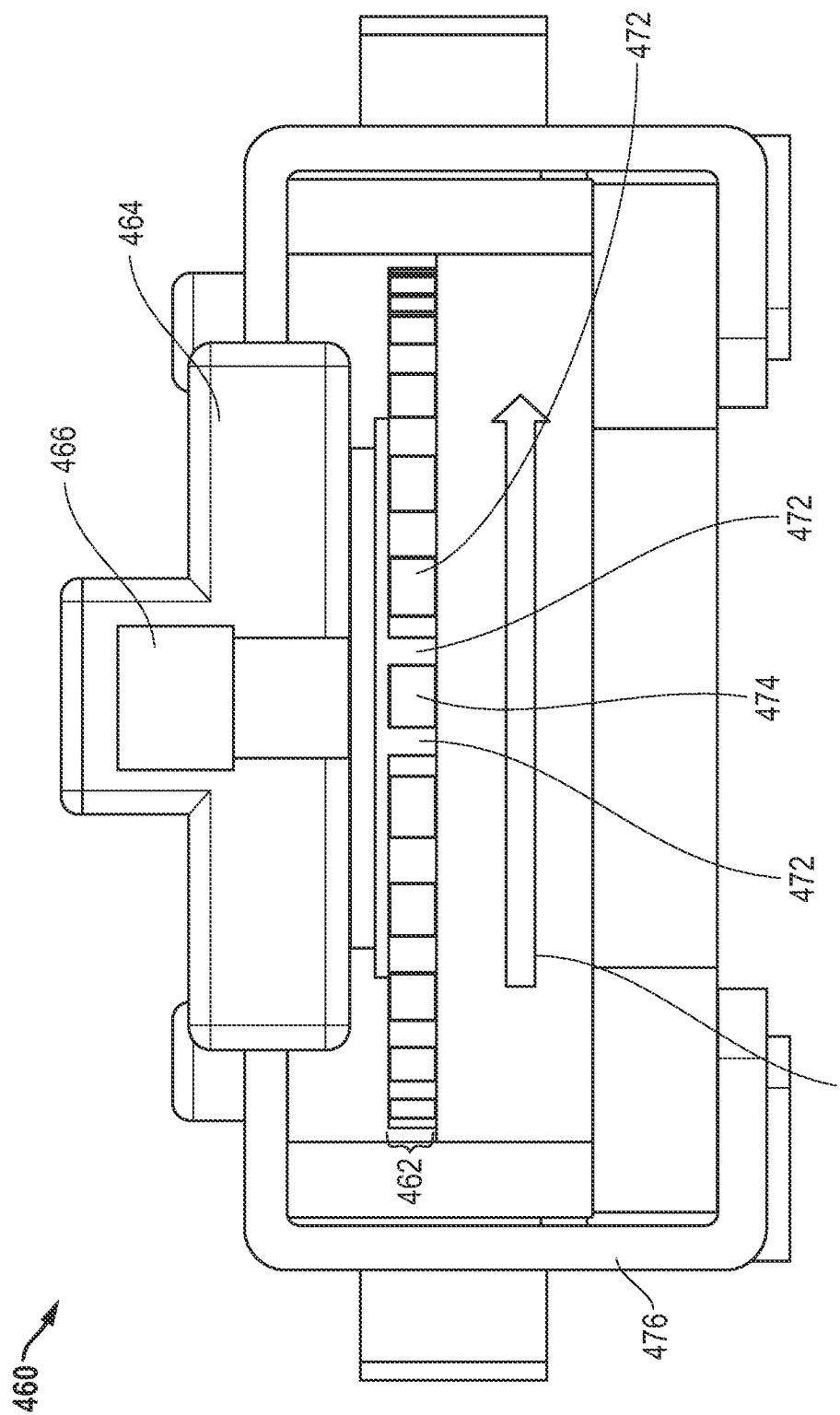

US 12,314,488 B2

SYSTEM AND METHOD FOR A QUIET MOUSE SCROLL WHEEL WITH MAGNETIC HAPTIC ENCODER

FIELD OF THE DISCLOSURE

The present disclosure generally relates to a mouse. The present disclosure more specifically relates to a mouse having a scroll wheel coupled to a magnetic haptic encoder.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more gaming applications. Further, the information handling system may include any number of peripheral devices including a mouse used to provide input to the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 4A is a top view of a magnetic haptic encoder operatively couplable to a scroll wheel of a mouse according to another embodiment of the present disclosure;

The use of the same reference symbols in different drawings may indicate similar or identical items.

DETAILED DESCRIPTION OF THE DRAWINGS

Figure 1:
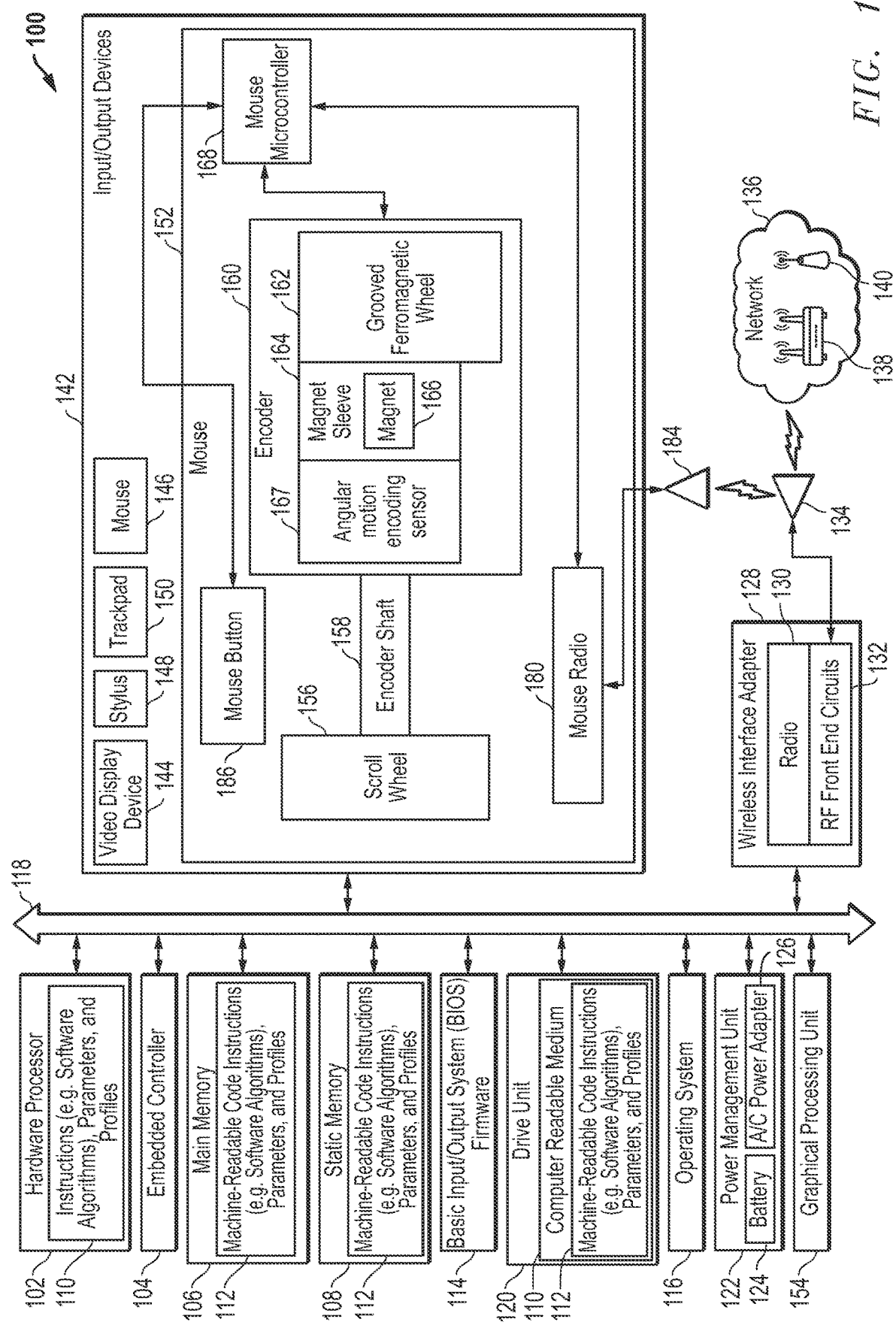
FIG. 1 is a block diagram illustrating an information handling system with a mouse having a scroll wheel and a magnetic haptic encoder according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems include input/output (I/O) devices that allow a user to interface with the information handling system. Some of these I/O devices may be wired I/O devices that transceive data to and from the information handling system via a wired connection at, for example a universal serial bus (USB) port. In other example embodiments, these I/O devices are wireless I/O devices that transceive data to and from the information handling system via a wireless connection facilitated by a wireless radio and antenna formed in the wireless I/O device. Some of these wired and wireless I/O devices include a wired or wireless mouse. The wired or wireless mouse may include a mouse movement sensor, a number of buttons and a scroll wheel to provide this input data, such as for cursor control, and item selection, to the information handling system. The scroll wheel for example, allows a user to perform a scrolling action across a graphical user interface (GUI) presented to a user via a video display device. The scroll wheel, in previous mice, includes an encoder that translates rotational movement of the scroll wheel into a digital signal via an angular motion encoding sensor provided to a mouse microcontroller indicative of a scrolling input to be transmitted an information handling system. The encoder angular motion encoding sensor may, for example rotate a magnet when the scroll wheel is rotated such that a Hall sensor may detect that rotation as scrolling input for a mouse controller. The encoder may include, in previous mice, a haptic generation device such as a plastic wheel having a wavy surface that interacts with a metal spring. The interaction between the wavy surface of the plastic wheel and the metal spring or second plastic wavy surface in some example embodiments for a mechanical haptic generation device in the encoder that creates haptic feedback to the user as well as prevent the scroll wheel from rotating freely. However, this mechanical interaction between the plastic wheel and the metal spring or other surface creates noise as the user rotates the scroll wheel. This noise may reduce the quality of the user experience where certain levels of the noise of the rotation of the scroll wheel is undesirable while scrolling.

The present specification describes a mouse operatively couplable to an information handling system that includes a mouse microcontroller and a mouse power management unit (PMU) to power the mouse microcontroller. In an embodiment, the mouse includes a scroll wheel to receive rotational input from a user and an encoder operatively coupled to the scroll wheel to detect an angular rotation of the scroll wheel and to convert changes in the angular position of the scroll wheel into a digital signal representing scrolling input data from the user. The encoder detecting rotation of the scroll wheel for scrolling input data may include and angular motion encoding sensor that is a mechanical encoder, magnetic encoder, optical encoder, capacitive encoder, or other to detect and digitally record the rotation in various embodiments herein. The encoder of embodiments of the present disclosure further includes a grooved ferromagnetic wheel and a magnet magnetically coupled to the grooved ferromagnetic wheel, wherein levels of magnetic coupling and decoupling of ferromagnetic teeth or prongs and gaps respectively of the grooved ferromagnetic wheel with the magnet mounted proximate with the grooved ferromagnetic wheel creates a noiseless haptic feedback to the user when the rotational input is received from the user.

In an embodiment, the grooved ferromagnetic wheel forms the magnetic haptic encoder of the embodiments herein and includes alternating wheel grooved portions, also referred to as gaps, and wheel raised portions, also referred to as prongs or teeth, to create alternating magnetic field attraction levels between the grooved ferromagnetic wheel and the magnet. This changing magnetic attraction level creates the haptic feedback in the scroll wheel. These alternating wheel grooved portions and wheel raised portions may interact with a magnet (permanent magnet or electromagnet) and create resistance at the encoder and scroll wheel such that the scroll wheel does not rotate freely when the magnet interacts with the grooved ferromagnetic wheel and to generate a haptic feel for the user. In an embodiment, the grooved ferromagnetic wheel includes a silicone steel wheel.

In an embodiment, the mouse further includes an encoder shaft operatively coupling the rotational angular position of the scroll wheel to the grooved ferromagnetic wheel and the angular motion encoding sensor of the magnetic haptic encoder of embodiments of the present disclosure. The haptic magnetic encoder, especially the angular motion encoding sensor digitizing rotation of the scroll wheel, may be operatively coupled to the mouse microcontroller to receive the scrolling input data signals indicative of the changes in the angular position of the scroll wheel and transmit those scrolling input data signals to the information handling system.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 154, hardware processor 102, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142 that may be wired or wireless, such as the mouse 152 described herein, a keyboard 146, a trackpad 150, a, a stylus 148, a video/graphics display device 144, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some embodiments, it is understood any or all portions of instructions (e.g., software algorithms), parameters, and profiles 112 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 154, or any other processing device. The information handling system 100 may also include one or more buses 118 operable to transmit communications between the various hardware components such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wireless communication with the I/O devices 142 such as the mouse 152 described herein, a keyboard 146, video display device 144, stylus 148, or trackpad 150 among other peripheral devices.

The information handling system 100 further includes a video/graphics display device 144. The video/graphics display device 144 in an embodiment may function as a liquid crystal display (LCD), an organic light emitting diode (OLED), a flat panel display, or a solid-state display. Additionally, as described herein, the information handling system 100 may include one or more other I/O devices 142 including the mouse 152 described herein that allows the user to interface with the information handling system 100 via the video/graphics display device 144 via alphanumeric input, other I/O devices 142 such as a cursor control device (e.g., a trackpad 150, or gesture or touch screen input), and/or a stylus 148, among others. Various drivers and control electronics may be operatively coupled to operate the I/O devices 142 according to the embodiments described herein. The present specification contemplates that the I/O devices 142 may be wired or wireless. In the context of the mouse 152 described herein, the mouse 152 is operatively coupled to the information handling system 100 via a wired or wireless connection. Where the mouse 152 is a wireless mouse 152, a mouse radio 180, and mouse antenna 184 may be used to operatively couple the wireless mouse 152 to the information handling system 100 via, for example, a Bluetooth® or Bluetooth Low Energy (BLE) (e.g., 2.4 GHz or 6 GHz) frequency. Where the mouse 152 is a wired mouse 152, the mouse 152 may be operatively coupled to the information handling system via a wired connection coupled to a universal serial bus (USB) port formed at the information handling system 100.

A network interface device of the information handling system 100 shown as wireless interface adapter 128 can provide connectivity among devices such as with Bluetooth® (e.g., 2.4 GHz) or to a network 136, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an AP 138 or base station 140 used to operatively couple the information handling system 100 to a network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the information handling system 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134 and other circuitry of the radio 130 such as one or more antenna ports used for wireless communications via multiple radio access technologies (RATs). The radio 130 may communicate with one or more wireless technology protocols.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a device connected to a network 136 may communicate voice, video, or data over the network 136. Further, the instructions 112 may be transmitted or received over the network 136 via the network interface device or wireless interface adapter 128.

The information handling system 100 may include a set of instructions 112 that may be executed to cause the computer system to perform any one or more of the methods or computer-based functions disclosed herein. For example, instructions 112 may be executed by a hardware processor 102, GPU 154, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 154 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 154 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 154, a video/graphic display device 144, or other wired I/O devices 142 such as the stylus 148, a keyboard 146, and a trackpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may be operatively coupled to a mouse 152 whether the mouse 152 is a wired mouse 152 or a wireless mouse 152. The mouse 152 may include a scroll wheel 156. The scroll wheel 156 may be used by a user to provide scrolling input to the information handling system. In an embodiment, the rotation of the scroll wheel 156 by a user is captured by a magnetic haptic encoder 160 operatively coupled to a mouse microcontroller 168. The magnetic haptic encoder 160 may convert the angular position of the scroll wheel 156 into a digital scrolling input signal via a mechanical, magnetic, optical, or other angular motion encoding sensor 167, where that digital scrolling input data is to be transmitted to the mouse microcontroller 168. The mouse microcontroller 168 may then transmit this digital scrolling input data to the information handling system 100 to direct, for example, a GUI to be scrolled.

The scroll wheel 156 may be operatively coupled to the magnetic haptic encoder 160 via an encoder shaft 158. The encoder shaft 158 may extend from the scroll wheel 156 and pass into a shaft keyway formed into the magnetic haptic encoder 160 so that the magnetic haptic encoder 160 may translate the rotational movement of the scroll wheel 156 into the scrolling input data signals as described herein. In an embodiment, the encoder shaft 158 may form a monolithic piece with the scroll wheel 156. In an embodiment, the encoder shaft 158 may form a monolithic piece with any portion of the magnetic haptic encoder 160 that rotates with the angular motion encoding sensor 167.

The magnetic haptic encoder 160 may include a grooved ferromagnetic wheel 162 and a magnet 166. In an embodiment, the magnetic interaction between the grooved ferromagnetic wheel 162 and the magnet 166 causes haptic feedback to be felt by a user as the user rotates the scroll wheel 156. The haptic feedback is created by the grooved ferromagnetic wheel 162 which includes alternating wheel grooved portions and wheel raised portions formed thereon. In an example embodiment, the wheel grooved portions are formed into the grooved ferromagnetic wheel 162 leaving the wheel raised portions, such as prongs or teeth, of ferromagnetic material that will magnetically interact with the magnet 166. The wheel raised portions of the grooved ferromagnetic wheel 162 may extend closer to the magnet 166 operatively coupled to the housing of the magnetic haptic encoder 160 when the adjacent or proximate grooved ferromagnetic wheel 162 spins to arrange the wheel raised portions next to the magnet 166. As the scroll wheel 156 is rotated by the user, the grooved ferromagnetic wheel 162 is also rotated such that the alternating wheel grooved portions and wheel raised portions of the grooved ferromagnetic wheel 162 pass the magnet 166. Because the wheel raised portions of the grooved ferromagnetic wheel 162 are closer to the magnet 166 or closer to its magnetic field, the magnetic attraction between the magnet 166 and the grooved ferromagnetic wheel 162 is increased. Further, because the wheel grooved portions or gaps in ferromagnetic material of the grooved ferromagnetic wheel 162 are situated further away from and not adjacent to the magnet 166 when next to the magnet 166 during rotation of the grooved ferromagnetic wheel 162, the magnetic attraction is reduced or not present. This alternating increased magnetic attraction and reduced magnetic attraction creates a haptic feedback that may be transmitted to the scroll wheel 156 via the attached encoder shaft 158 such that the user feels this haptic feedback.

The magnetic haptic encoder 160, as described herein, also includes a magnet sleeve 164 holding the magnet 166 that interacts with the grooved ferromagnetic wheel 162 as described herein. In an embodiment, this magnet 166 is operatively coupled to the magnetic haptic encoder 160 via the magnet sleeve 164 that holds the magnet 166 at a distance away from the grooved ferromagnetic wheel 162. The magnet sleeve 164 may be, in an example embodiment, a rubber or silicone sleeve that is operatively coupled to or formed the housing of the magnetic haptic encoder 160 via a fastening device such as a hook, plastic holder, screw, or bolt or an adhesive. The magnet sleeve 164 may include a void into which the magnet 166 may be placed. In an embodiment, the void formed into the magnet sleeve 164 may be slightly larger than the magnet 166 such that as the magnet 166 is attracted to the wheel raised portions of the grooved ferromagnetic wheel 162 and not as attracted to the wheel grooved portions of the grooved ferromagnetic wheel 162, the magnet 166 may be allowed to move within the magnet sleeve 164. This movement may also create a haptic sensation at the scroll wheel 156 via the encoder shaft 158. This haptic feedback may combine with the haptic feedback felt at the scroll wheel 156 due to the alternating wheel raised portions and wheel grooved portions on the grooved ferromagnetic wheel 162 so that the user may feel a stopping sensation and a vibration sensation at the scroll wheel 156.

In an embodiment, the magnet 166 is a permanent magnet such as a neodymium magnet. In an alternative embodiment, the magnet 166 may be an electromagnet that is operatively controlled by the mouse microcontroller 168. In an embodiment, the mouse microcontroller 168 may be operatively coupled to a mouse button 186 formed on an outer surface of the housing of the mouse. During operation, a user may rotate the scroll wheel 156 feeling the haptic feedback created via interaction between the magnet 166 and the grooved ferromagnetic wheel 162 as described herein. The user may also actuate the mouse button 186 or other mouse button or set a setting in order to disable the electromagnet thereby preventing the magnetic interaction between the electromagnet and the grooved ferromagnetic wheel 162. This allows the user to rotate the scroll wheel 156 freely without feeling the haptic feedback. Thus, in the example embodiments where the magnet 166 is an electromagnet, the user may engage or disengage the magnetic interaction between the electromagnet and the grooved ferromagnetic wheel 162 in order to selectively feel or not feel the haptic feedback, respectively. This also allows the user to selectively rotate the scroll wheel 156 such that it doesn't rotate freely or does rotate freely, respectively. By allowing the scroll wheel 156 to rotate freely by actuating the mouse button 186 and disengaging the electromagnet, the user may scroll faster in a freespin mode through longer lengths of, for example, a document presented on a GUI on the video display device 144. Such a mode change may be communicated to a mouse driver executing on a hardware processor 101 of information handling system 100 in some embodiments to switch to a freespin mode allowing faster scrolling in the GUI.

The use of a magnet 166 and grooved ferromagnetic wheel 162 in the magnetic haptic encoder 160 allows for a frictionless and touchless interaction between these devices. Because of this lack of actual mechanical interaction between the magnet 166 and the grooved ferromagnetic wheel 162, the rotation of the scroll wheel 156 is noiseless or near noiseless thereby reducing or eliminating noises associated with the operation of the scroll wheel 156. Because the grooved ferromagnetic wheel 162 has wheel grooved portions and wheel raised portions alternately interacting with magnet 166, haptic feedback is still felt at the scroll wheel 156 as described. Even further, additional haptic feedback may be produced by the movement of the magnet 166 within the magnet sleeve 164. This may improve user satisfaction during operation of the scroll wheel 156 and the mouse 152.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
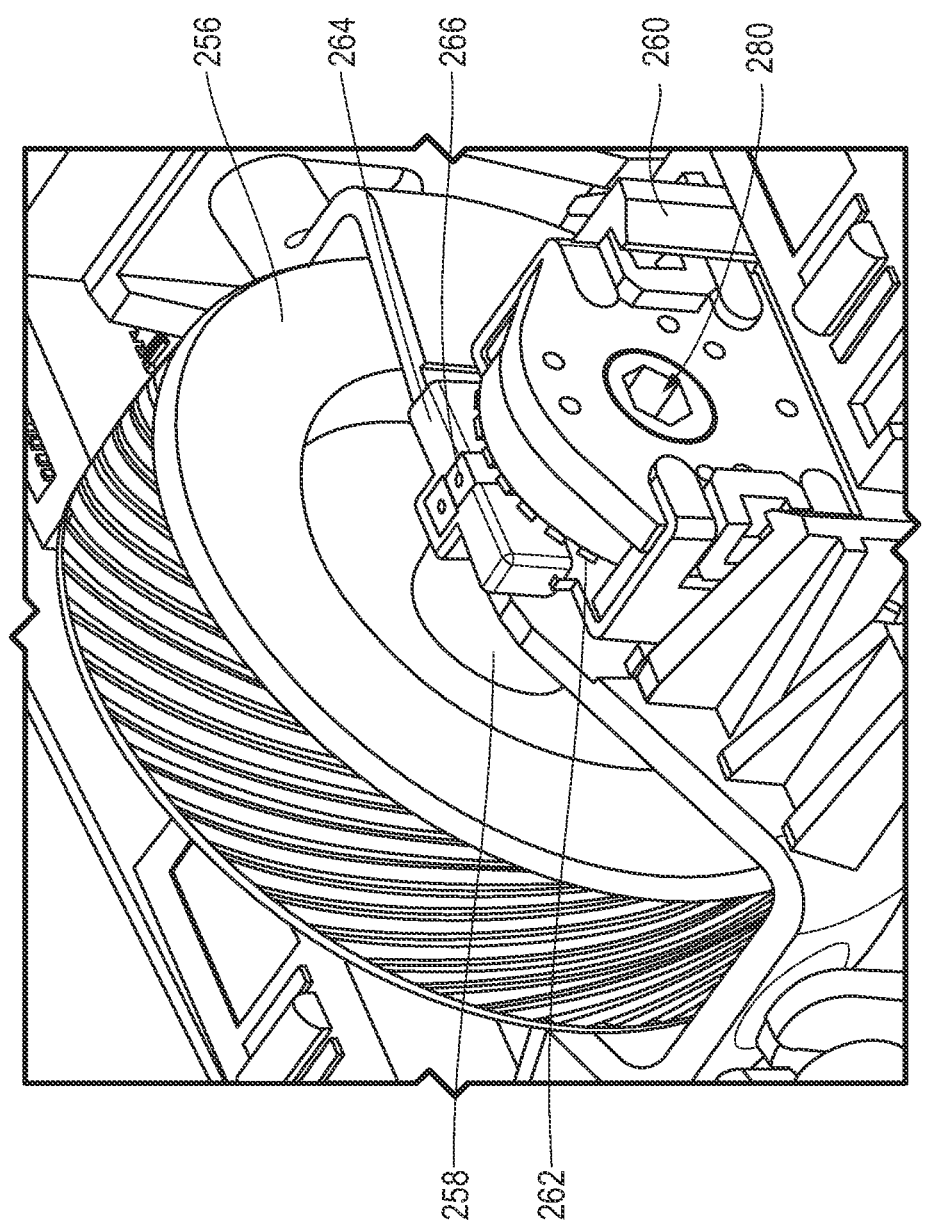
FIG. 2 is a top perspective view of a scroll wheel and a magnetic haptic encoder of a mouse according to an embodiment of the present disclosure.

FIG. 2 is a top perspective view of a scroll wheel 256 and a magnetic haptic encoder 260 of a mouse according to an embodiment of the present disclosure. FIG. 2 shows the scroll wheel 256 in a cradle and a magnetic haptic encoder 260 formed into a base housing of the mouse. In an embodiment, the components of the scroll wheel 256 and the magnetic haptic encoder 260 may be enclosed into the mouse by coupling a top housing of the mouse to the base housing.

As described herein, the mouse may include a scroll wheel 256. The scroll wheel 256 may be used by a user to provide scrolling input to an information handling system. In an embodiment, the rotation of the scroll wheel 256 by a user is captured by an angular motion encoding sensor of the magnetic haptic encoder 260 operatively coupled to rotate with an encoder shaft 258 and to send scrolling input data to a mouse microcontroller (not shown). The angular motion encoding sensor of magnetic haptic encoder 260 may convert the angular position of the scroll wheel 256 into a scrolling input signal mechanically, magnetically, optically, electrically or by other mechanisms understood in the art. The scrolling input signal is to be transmitted to the mouse microcontroller. The mouse microcontroller may then transmit this rotational scrolling input data to the information handling system (not shown) to direct, for example, a GUI to be scrolled.

The scroll wheel 256 is operatively coupled to the magnetic haptic encoder 260 and angular motion encoding sensor via the encoder shaft 258. The encoder shaft 258 may extend from the scroll wheel 256 and pass into a shaft keyway 280 formed into the magnetic haptic encoder 260 so that the magnetic haptic encoder 260 may translate the rotational movement of the scroll wheel 256 into the scrolling input signals as described herein. In an embodiment, the encoder shaft 258 may form a monolithic piece with the scroll wheel 256, a rotating portion of the angular motion encoding sensor, or both.

The magnetic haptic encoder 260 may include a grooved ferromagnetic wheel 262 and a magnet 266. In an embodiment, the magnetic interaction between the grooved ferromagnetic wheel 262 and the magnet 266 causes haptic feedback to be felt by a user as the user rotates the scroll wheel 256 which is silent. The haptic feedback is created by the grooved ferromagnetic wheel 262 which includes alternating wheel grooved portions, such as gaps, and wheel raised portions, such as prongs or teeth, formed thereon. In an example embodiment, the wheel grooved portions are formed into the grooved ferromagnetic wheel 262 leaving the wheel raised portions. The wheel raised portions of the grooved ferromagnetic wheel 262 may rotate closer to the magnet 266 which is proximately adjacent to the side of the rotating grooved ferromagnetic wheel 262 than the grooved portions during operation of the magnetic haptic encoder 260. As such, as the scroll wheel 256 is rotated by the user, the grooved ferromagnetic wheel 262 is also rotated such that the alternating wheel grooved portions and wheel raised portions of the grooved ferromagnetic wheel 262 past the magnet 266. Because the wheel raised portions of the grooved ferromagnetic wheel 262 are closer to the magnet 266 and its magnetic field during rotation, the magnetic attraction between the magnet 266 and the grooved ferromagnetic wheel 262 wheel raised portion is increased relative to the grooved portion. Further, because the wheel grooved portions of the grooved ferromagnetic wheel 262 are situated further away from the magnet 266 and less in its magnetic field than the wheel raised portions of the grooved ferromagnetic wheel 262, the magnetic attraction is reduced or not present relative to the wheel raised portions. This alternating increased magnetic attraction and reduced magnetic attraction during rotation next to the magnet 266 creates a haptic feedback by alternating resistance on the scroll wheel 256 that may be transmitted to the scroll wheel 256 via the attached encoder shaft 258 such that the user feels this haptic feedback.

The magnetic haptic encoder 260, as described herein, also includes a magnet 266 that may be a permanent magnet that interacts with the grooved ferromagnetic wheel 262 as described herein. In an embodiment, this magnet 266 is operatively coupled to the magnetic haptic encoder 260 via a magnet sleeve 264 that holds the magnet 266 at a distance away from the outer circumferential portion of the grooved ferromagnetic wheel 262. The magnet sleeve 264 may be, in an example embodiment, a rubber sleeve that is operatively coupled to the housing of the magnetic haptic encoder 260 via a fastening device such as a hook, formed plastic holder, screw, or bolt or an adhesive. The magnet sleeve 264 may include a void into which the magnet 266 may be placed. In an embodiment, the magnet sleeve 264 may be slightly flexible with the magnet 266 such that as the magnet 266 is attracted to the wheel raised portions of the grooved ferromagnetic wheel 262 and not attracted to the wheel grooved portions of the grooved ferromagnetic wheel 262, the magnet 266 may be allowed to move within the magnet sleeve 264. This movement may also create an additional haptic sensation at the scroll wheel 256 via the encoder shaft 258. This haptic feedback may combine with the haptic feedback felt at the scroll wheel 256 due to the alternating wheel raised portions and wheel grooved portions on the grooved ferromagnetic wheel 262 so that the user may feel a stopping sensation and a vibration sensation at the scroll wheel 256.

In an embodiment, the magnet 266 is a permanent magnet such as a neodymium magnet. In an alternative embodiment, the magnet 266 may be an electromagnet that is operatively controlled by the mouse microcontroller. In an embodiment, the mouse microcontroller may be operatively coupled to a mouse button (not shown) formed on an outer surface of the housing of the mouse or other mode control. During operation, a user may rotate the scroll wheel 256 feeling the haptic feedback created via interaction between the magnet 266 and the grooved ferromagnetic wheel 262 as described herein. The user may also actuate the mouse button or other mode control in order to pulse the electromagnet via the mouse microcontroller to disable the electromagnet thereby preventing the magnetic interaction between the electromagnet and the grooved ferromagnetic wheel 262 in an embodiment. This allows the user to rotate the scroll wheel 256 freely without feeling the haptic feedback. Thus, in such an example embodiments where the magnet 266 is an electromagnet, the user may engage or disengage the magnetic interaction between the electromagnet and the grooved ferromagnetic wheel 262 in order to selectively feel or not feel the haptic feedback, respectively. This also allows the user to selectively rotate the scroll wheel 256 such that it doesn't rotate freely in a haptic mode or does rotate freely in a freespin mode, respectively. By allowing the scroll wheel 256 to rotate freely by actuating the mouse button or other control and disengaging the electromagnet, the user may scroll more quickly through longer lengths of, for example, a document presented on a GUI on the video display device (not shown). The mouse microcontroller may communicate the freespin mode or haptic mode to a mouse driver executing on a hardware processor of the information handling system in an embodiment.

Figure 3:
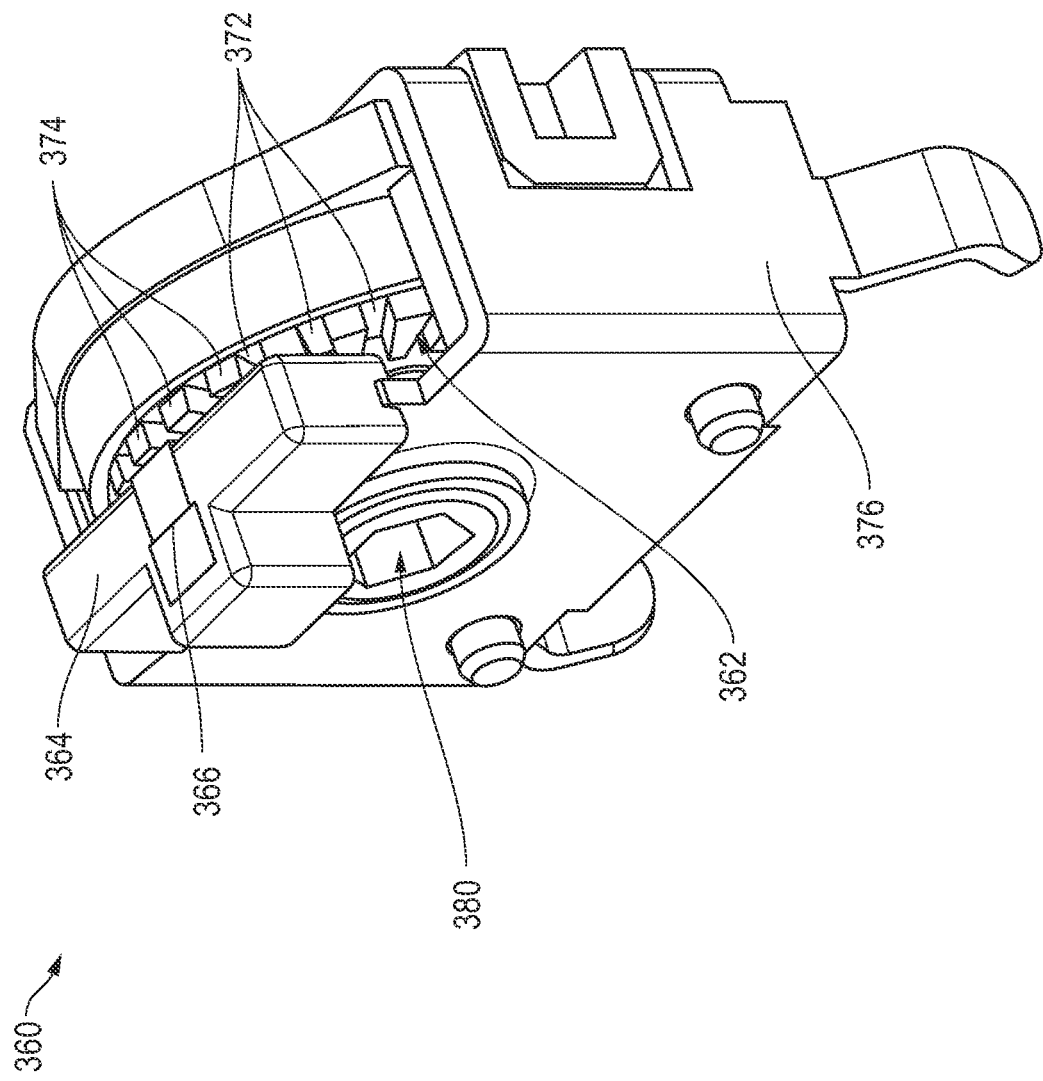
FIG. 3 is a top perspective view of a magnetic haptic encoder operatively couplable to a scroll wheel of a mouse according to an embodiment of the present disclosure.

FIG. 3 is a top perspective view of a magnetic haptic encoder 360 operatively couplable to a scroll wheel of a mouse according to another embodiment of the present disclosure. The magnetic haptic encoder 360 may include an encoder housing 376. The encoder housing 376 may be operatively coupled to a housing of the mouse such as a base housing of the mouse using any fastening device such as a screw, bolt, or hook, interference fit structures, or any adhesive. As described herein, the magnetic haptic encoder 360 is operatively coupled to a scroll wheel via an encoder shaft thereby operatively coupling the rotation of the scroll wheel by a user to the rotation of the grooved ferromagnetic wheel 362 as described herein. In an embodiment, the encoder shaft may pass into a shaft keyway 380 formed through the magnetic haptic encoder 360 and the grooved ferromagnetic wheel 362. As shown in FIG. 3, the shaft keyway 380 has a hexagonal cross-section into which a hexagonal prism-shaped encoder shaft may fit. In an embodiment, the angular motion encoding sensor may be disposed in or near the rotating encoder shaft of magnetic haptic encoder 360.

The magnetic haptic encoder 360 may include a grooved ferromagnetic wheel 362 and a magnet 366. In embodiments herein, the magnetic interaction between the grooved ferromagnetic wheel 362 and the magnet 366 causes haptic feedback to be felt by a user as the user rotates the scroll wheel (not shown) and, thus, the ferromagnetic wheel 362. The haptic feedback is created by the grooved ferromagnetic wheel 362 which includes alternating wheel grooved portions 372 and wheel raised portions 374 formed thereon. In an example embodiment, the wheel grooved portions 372 are formed into the grooved ferromagnetic wheel 362 leaving the wheel raised portions 374. The wheel raised portions 374 of the grooved ferromagnetic wheel 362 may extend closer into the magnetic field of magnet 366 operatively coupled to the housing of the magnetic haptic encoder 360 during rotation than the wheel grooved portions 372.

During operation, as the scroll wheel is rotated by the user, the grooved ferromagnetic wheel 362 is also rotated such that the alternating wheel grooved portions 372 and wheel raised portions 374 of the grooved ferromagnetic wheel 362 pass the magnet 366. Because the wheel raised portions 374 of the grooved ferromagnetic wheel 362 are closer into magnetic field of the magnet 366, the magnetic attraction between the magnet 366 and the grooved ferromagnetic wheel 362 is increased relative to when the grooved portions 372 are passing next to the magnet 366. Further, because the wheel grooved portions 372 of the grooved ferromagnetic wheel 362 are situated away from the magnetic field of the magnet 366 than the wheel raised portions 374 of the grooved ferromagnetic wheel 362, the magnetic attraction is reduced or not present relative to the wheel raised portions 374. This alternating increased magnetic attraction and reduced magnetic attraction during rotation of the grooved ferromagnetic wheel 362 past magnet 366 creates a haptic feedback that may be transmitted to the scroll wheel via the attached encoder shaft such that the user feels this haptic feedback.

The magnetic haptic encoder 360, as described herein, also includes a magnet 366 that interacts with the grooved ferromagnetic wheel 362 as described herein. In an embodiment, this magnet 366 is operatively coupled to the magnetic haptic encoder 360 via a magnet sleeve 364 that holds the magnet 366 at a distance away from the grooved ferromagnetic wheel 362. The magnet sleeve 364 may be, in an example embodiment, a rubber or silicone sleeve that is operatively coupled to the housing of the magnetic haptic encoder 360 via a fastening device such as a hook, screw, formed plastic holder, or bolt or an adhesive. The magnet sleeve 364 may include a void into which the magnet 366 may be placed. In an embodiment, the magnet sleeve 364 may be flexible such that as the magnet 366 is attracted to the wheel raised portions 374 of the grooved ferromagnetic wheel 362 and not attracted to the wheel grooved portions 372 of the grooved ferromagnetic wheel 362, the magnet 366 may be allowed to move within the magnet sleeve 364. This movement may also create a haptic sensation at the scroll wheel via the encoder shaft. This haptic feedback may combine with the haptic feedback felt at the scroll wheel due to the alternating wheel raised portions and wheel grooved portions on the grooved ferromagnetic wheel 362 so that the user may feel a stopping sensation and a vibration sensation at the scroll wheel.

In an embodiment, the magnet 366 is a permanent magnet such as a neodymium magnet. In an alternative embodiment, the magnet 366 may be an electromagnet that is operatively controlled by the mouse microcontroller such that the magnet may be turned off with a pulse of current or voltage to control whether a haptic mode or freespin mode is set according to embodiments herein. In an embodiment, the mouse microcontroller may be operatively coupled to a mouse button (not shown) or other control interface formed on an outer surface of the housing of the mouse to receive input to switch between the haptic mode or freespin mode. Thus, in the example embodiments where the magnet 366 is an electromagnet, the user may engage or disengage the magnetic interaction between the electromagnet and the grooved ferromagnetic wheel 362 in order to selectively feel or not feel the haptic feedback, respectively.

Figure 4B:
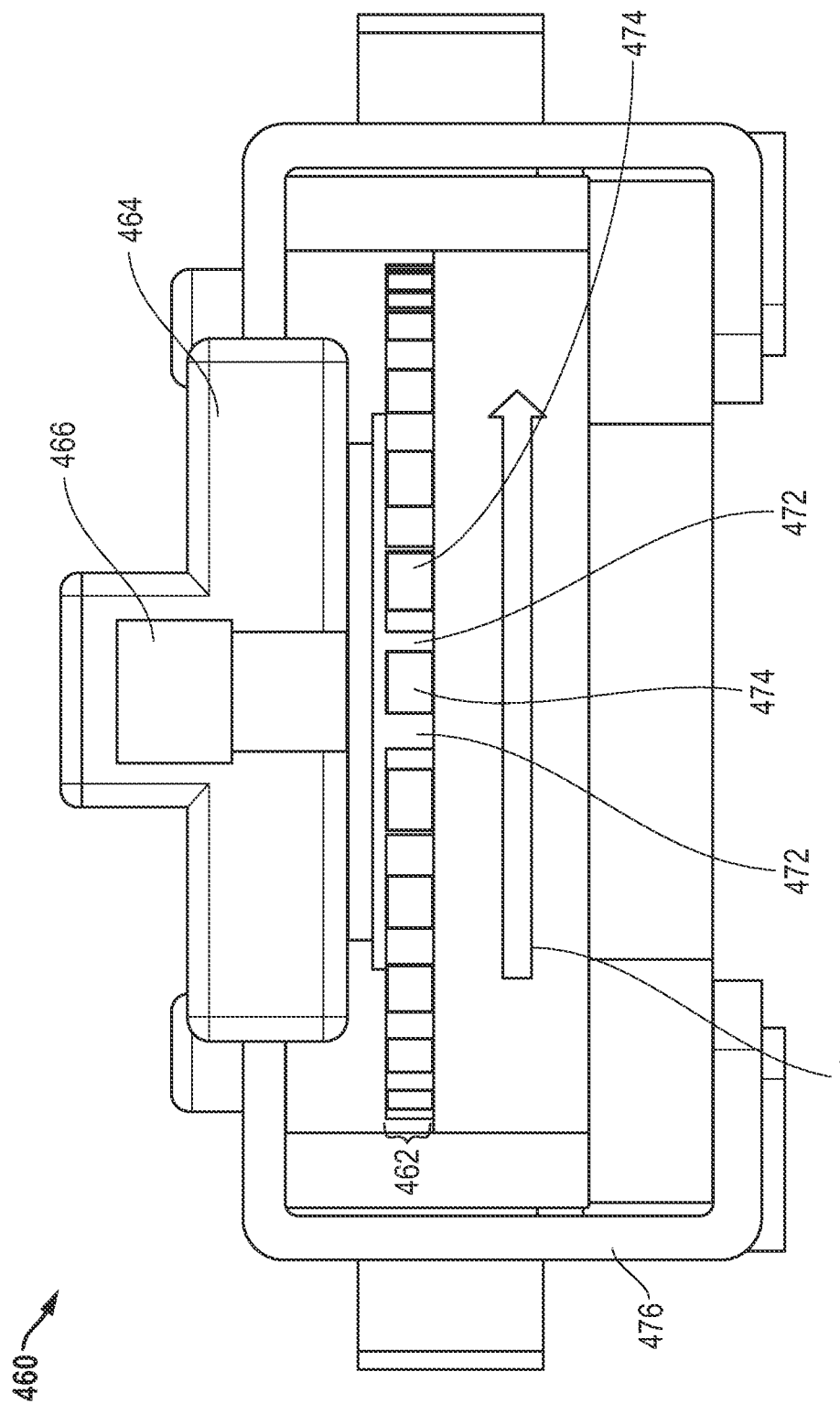
FIG. 4B is a top view of a magnetic haptic encoder operatively couplable to a scroll wheel of a mouse according to yet another embodiment of the present disclosure.

FIG. 4A is a top view of an encoder 460 operatively couplable to a scroll wheel (not shown) of a mouse (not shown) according to another embodiment of the present disclosure. Similarly, FIG. 4B is a top view of an encoder 460 operatively couplable to a scroll wheel of a mouse according to another embodiment of the present disclosure. As described herein, the encoder 460 includes an encoder housing 476 that is couplable to a housing of a mouse (e.g., a base housing of the mouse) via an adhesive or a fastener such as a screw, bolt, hooks, clips, or another fastener type. The encoder 460 also includes a magnet sleeve 464 with a magnet 466 placed within a void formed in the magnet sleeve 464. Again, the magnet sleeve 464 may be made of rubber or silicone and may be operatively coupled to the encoder housing 476 via an adhesive, a fastener or a formed holder with clips or other structures to hold the magnet sleeve 464.

Each of FIGS. 4A and 4B show a wheel rotation direction 478 from left to right of the figures. As described herein, the grooved ferromagnetic wheel 462 includes alternating wheel grooved portions 372 and wheel raised portions 374 formed thereon. In an example embodiment, the wheel grooved portions 372 are formed into the grooved ferromagnetic wheel 362 leaving the wheel raised portions 374. The wheel raised portions 374 at the outer circumferential portion of the grooved ferromagnetic wheel 362 may pass closer to the magnet 366 operatively coupled to the housing of the magnetic haptic encoder 360 than the grooved wheel portions 372 as the grooved ferromagnetic wheel 362 rotates.

During operation, as the scroll wheel is rotated by the user, the grooved ferromagnetic wheel 462 is also rotated such that the alternating wheel grooved portions 472 and wheel raised portions 474 of the grooved ferromagnetic wheel 462 pass the magnet 466 as described. FIG. 4A shows a single wheel raised portion 474 adjacent to the magnet 466 and in the magnetic field thereby creating a magnetic attraction between the grooved ferromagnetic wheel 462 (e.g., this specific wheel raised portion 474) and the magnet 466. As the user rotates the scroll wheel (not shown) of the mouse in the wheel rotation direction 478 with force sufficient to overcome this magnetic attraction between the wheel raised portion 474 and the magnet 466, the wheel grooved portion 472 passes the magnet 466 as shown in FIG. 4B. Indeed, because the wheel grooved portions 472 of the grooved ferromagnetic wheel 462 are situated further away from the magnet 466 and its magnetic field than the wheel raised portions 474 of the grooved ferromagnetic wheel 462, the magnetic attraction is reduced or not present. As shown in FIG. 4B, the scroll wheel has been rotated such that the wheel grooved portion 472 is now adjacent to the magnet 366 reducing or eliminating this magnetic attraction. It is appreciated that this alternating increased magnetic attraction and reduced magnetic attraction creates the haptic feedback that may be transmitted to the scroll wheel via the attached encoder shaft such that the user feels this haptic feedback at the scroll wheel as the scroll wheel is rotated by the user.

Figure 5:
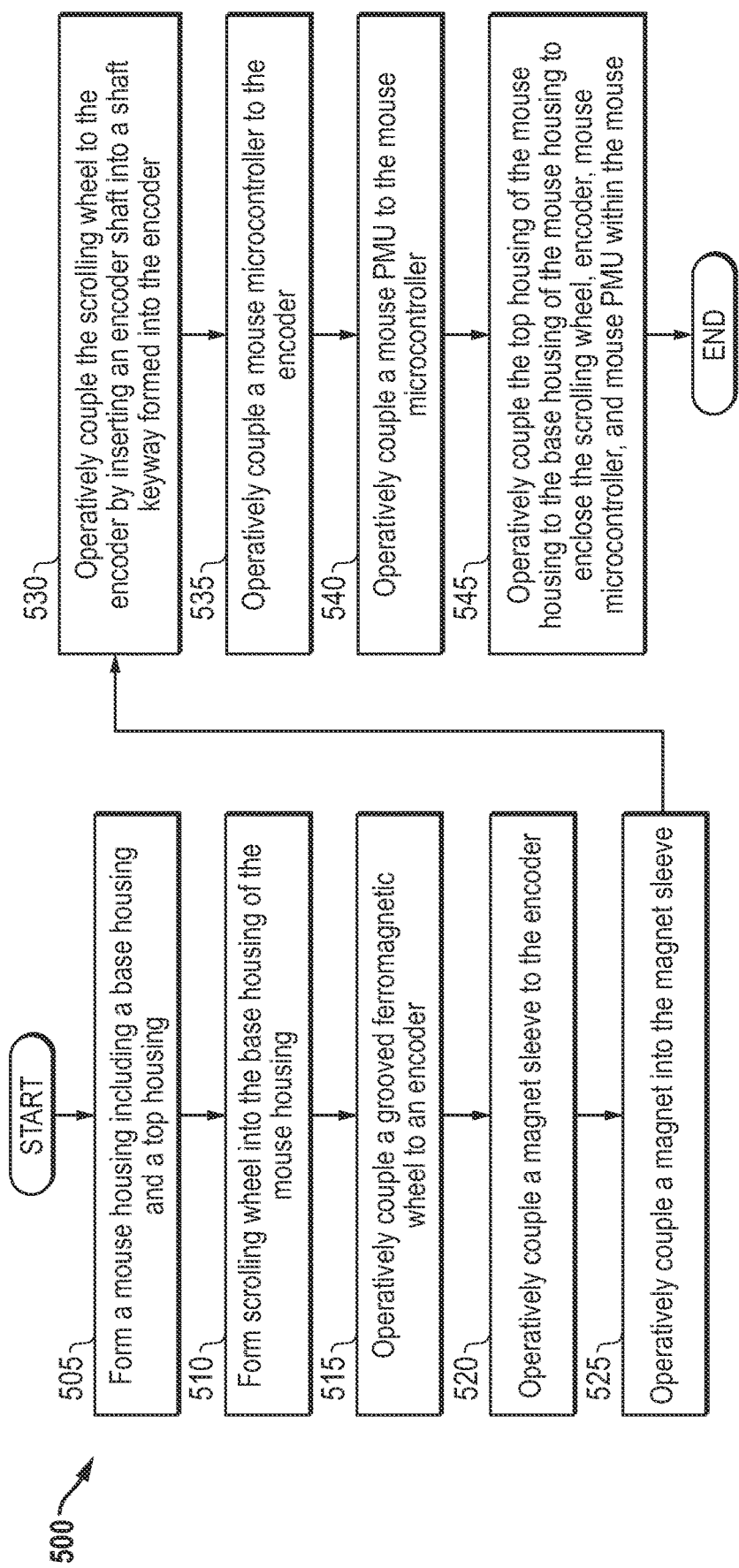
FIG. 5 is a block flow diagram illustrating a method of manufacturing a mouse according to an embodiment of the present disclosure.

FIG. 5 is a block flow diagram illustrating a method 500 of manufacturing a mouse according to an embodiment of the present disclosure. The method 500 may include, at block 505, forming a mouse housing including a base housing and a top housing. It is appreciated that other housing may be formed to enclose the components of the mouse and the present specification contemplates these other housing types.

At block 510, the method 500 includes forming a scroll wheel and operatively coupling the scroll wheel into the base chassis of the mouse. As described herein, the scroll wheel may include an encoder shaft that extends generally from a central axis of the scroll wheel. The encoder shaft and the scroll wheel may form a single monolithic piece.

The method 500 further includes operatively coupling a grooved ferromagnetic wheel to an angular motion encoding sensor of an encoder at block 515 to form a magnetic haptic encoder according to embodiments of the present disclosure. The grooved ferromagnetic wheel may be made of any ferromagnetic material that creates a magnetic attraction with a magnet (e.g., permanent or electromagnet). In an embodiment, the grooved ferromagnetic wheel is made of silicone steel. As described herein, the grooved ferromagnetic wheel has a number of wheel grooved portions formed into a face of the grooved ferromagnetic wheel facing the magnet. The creation of the wheel grooved portions may be made by any processing methods including laser ablation, acid etching, metal casting, machining, and the like. The creation of the wheel grooved portions also may form wheel raised portions that and even may extend out from the surface of the grooved ferromagnetic wheel in some embodiments. The wheel raised portions are physically formed to be closer to a side of the magnet when the magnetic haptic encoder is assembled. The wheel grooved portions and wheel raised portions alternate along the surface of the grooved ferromagnetic wheel.

It is appreciated that the angular motion encoding sensor of the magnetic haptic encoder is a rotary encoder. A rotary encoder detects the angular rotation and position of the encoder shaft or the grooved ferromagnetic wheel via the angular motion encoding sensor and, thus, the scroll wheel (e.g., scroll wheel being mechanically coupled to the grooved ferromagnetic wheel via the encoder shaft) too. The angular motion encoding sensor converts this angular rotation and position into a scrolling input signal that is sent to a mouse microcontroller within the mouse.

At block 520, the method 500 further includes operatively coupling a magnet sleeve to the encoder. The magnet sleeve may be placed at a location opposite the face of the grooved ferromagnetic wheel into which the wheel grooved portions and wheel raised portions are formed. The magnet sleeve may be installed into a formed plastic portion of a housing for the magnetic haptic encoder, held with clips, a holder, or fasteners according to various embodiments herein. In an embodiment, the magnet sleeve includes a void into which a magnet may be placed. As described herein, the void formed into the magnet sleeve may be of a flexible material such as rubber or silicone such that as the magnet is attracted to the wheel raised portions of the grooved ferromagnetic wheel and not attracted to the wheel grooved portions of the grooved ferromagnetic wheel, the magnet may be allowed to move within the magnet sleeve. The void may also be larger than the magnet allowing movement of the magnet. Again, this allows for movement of the magnet that creates a haptic sensation at the scroll wheel via the encoder shaft. This haptic feedback may combine with the haptic feedback felt at the scroll wheel due to the alternating wheel raised portions and wheel grooved portions on the grooved ferromagnetic wheel so that the user may feel a stopping sensation and a vibration sensation at the scroll wheel.

At block 525, a magnet may be placed within the magnet sleeve. In an embodiment, the magnet is a permanent magnet such as a neodymium magnet. In an alternative embodiment, the magnet may be an electromagnet that is operatively controlled by the mouse microcontroller. In an embodiment, the mouse microcontroller may be operatively coupled to a mouse button formed on an outer surface of the housing of the mouse used to control the activation and deactivation of the electromagnet to switch between a haptic mode or freespin mode. During operation, for example, a user may rotate the scroll wheel feeling the haptic feedback created via interaction between the magnet and the grooved ferromagnetic wheel as described in embodiments herein. The user may also actuate the mouse button in order to disable the electromagnet thereby preventing the magnetic interaction between the electromagnet and the grooved ferromagnetic wheel in an embodiment. This allows the user to rotate the scroll wheel freely without feeling the haptic feedback in a freespin mode. This also allows the user to selectively rotate the scroll wheel such that it doesn't rotate freely or does rotate freely, respectively. By allowing the scroll wheel to rotate freely by actuating the mouse button and disengaging the electromagnet, the user may scroll through faster longer lengths of, for example, a document presented on a GUI on the video display device.

At block 530, the method 500 includes operatively coupling the scroll wheel to the magnetic haptic encoder by inserting an encoder shaft into a shaft keyway formed into the magnetic haptic encoder. In an embodiment, as shown in FIG. 3 for example, the shaft keyway formed in the encoder has a hexagonal cross-section into which a hexagonal prism-shaped encoder shaft may fit. It is appreciated that the shaft keyway and encoder shaft may have different shapes that allow the encoder shaft to be inserted into the shaft keyway so that the rotation of the scroll wheel can rotate the grooved ferromagnetic wheel of the magnetic haptic encoder as well as activate the angular motion encoding sensor to detect the rotation.

At block 535, the method 500 includes operatively coupling a mouse microcontroller to the magnetic haptic encoder. As described herein, the magnetic haptic encoder has angular motion encoding sensor that converts detected rotation and position of the scroll wheel and grooved ferromagnetic wheel or other rotating portion of the angular motion encoding sensor operatively coupled to the encoder shaft into a scrolling input signal that is sent to the mouse microcontroller. The mouse microcontroller may also transmit this rotational scrolling input data to the information handling system executing a mouse driver to direct, for example, a GUI to be scrolled. Again, where the mouse is a wireless mouse, a mouse radio, mouse RF front end circuit, and mouse antenna may be formed within the housing of the mouse, operatively coupled to the mouse microcontroller, and used to operatively couple the wireless mouse to the information handling system via, for example, a Bluetooth® or Bluetooth Low Energy (BLE) (e.g., 2.4 GHz or 6 GHz) frequency. Where the mouse is a wired mouse, the mouse may be operatively coupled to the information handling system via a wired connection coupled to a USB port formed at the information handling system.

The method 500 further includes, at block 540, operatively coupling a mouse PMU to the mouse microcontroller. Again, the mouse PMU may include a hardware controller and executable machine-readable code instructions to manage the power provided to the components of the mouse such as the mouse microcontroller, the encoder, and the mouse radio, among other components such as light emitting diodes (LEDs) where present. The mouse PMU may regulate power from a power source such as the battery.

At block 545, the method 500 includes operatively coupling the top housing of the mouse housing to the base housing of the mouse housing to enclose the scroll wheel, the haptic magnetic encoder, mouse microcontroller, and mouse PMU within the mouse. At this point, the method 500 may end.

The blocks of the flow diagrams of FIG. 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A mouse operatively couplable to an information handling system comprising:
    a mouse microcontroller;
    a mouse power management unit (PMU) to power the mouse microcontroller;
    a scroll wheel to receive rotational input from a user;
    a magnetic haptic encoder operatively coupled to the scroll wheel to detect an angular rotation of the scroll wheel via an angular motion encoding sensor to convert changes in the angular position of the scroll wheel due to rotation into a scrolling input signal to the mouse microcontroller;
    the magnetic haptic encoder comprising:
        a grooved ferromagnetic wheel having alternating wheel raised portions and wheel grooved portions operatively coupled to the scroll wheel;
        an angular motion encoding sensor in a housing of the magnetic haptic encoder to encode rotation of a scroll wheel shaft; and
        a magnet operatively coupled to the housing of the magnetic haptic encoder adjacent to a face of the grooved ferromagnetic wheel such that the face of the grooved ferromagnetic wheel rotates adjacent to the magnet in the housing along an outer edge of the grooved ferromagnetic wheel, wherein magnetic coupling of the magnet with the alternating wheel raised portions and wheel grooved portions of the grooved ferromagnetic wheel generates haptic feedback to the user when the user rotates the scroll wheel.

2. The mouse of claim 1 further comprising:
    the grooved ferromagnetic wheel including the alternating wheel grooved portions and wheel raised portions located at an outer circumference of the grooved ferromagnetic wheel to create alternating levels of magnetic attraction between the rotating grooved ferromagnetic wheel and the magnet to create the haptic feedback.

3. The mouse of claim 1 further comprising:
    a magnet sleeve to operatively couple the magnet to the housing of the haptic encoder.

4. The mouse of claim 1 further comprising:
    the magnetic haptic encoder operatively coupled to the mouse microcontroller to receive the scrolling input signals based on rotation of the scroll wheel and transmit the scrolling input signals to the information handling system.

5. The mouse of claim 1, wherein the grooved ferromagnetic wheel is formed of a silicone steel.

6. The mouse of claim 1 further comprising:
    an encoder shaft operatively coupling the scroll wheel to the grooved ferromagnetic wheel of the magnetic haptic encoder.

7. The mouse of claim 1, wherein the magnet is a permanent magnet.

8. A method of manufacturing a mouse comprising:
coupling a scroll wheel into a base chassis of the mouse via a cradle;
forming a grooved ferromagnetic wheel having alternating wheel raised portions and wheel grooved portions operatively coupled via a shaft with the scroll wheel;
forming a magnetic haptic encoder comprising an angular motion encoding sensor in a housing of the magnetic haptic encoder to encode rotation of the scroll wheel and the grooved ferromagnetic wheel and a magnet mounted in the magnetic haptic encoder adjacent to a face of the grooved ferromagnetic wheel such that the face of the grooved ferromagnetic wheel rotates adjacent to the magnet in the housing, where the magnet magnetically interacts with an outer edge of the grooved ferromagnetic wheel as it rotates to generate a haptic feedback in the scroll wheel;
operatively coupling the magnetic haptic encoder into the base chassis of the mouse;
operatively coupling the scroll wheel to the magnetic haptic encoder such that the grooved ferromagnetic wheel rotates with the scroll wheel rotation;
operatively coupling the magnetic haptic encoder to a mouse microcontroller; and
operatively coupling a top housing of the mouse to the base chassis of the mouse to enclose the mouse.

9. The method of claim 8 further comprising:
operatively coupling the magnet to the magnetic haptic encoder via a magnetic sleeve to hold the magnet relative to the grooved ferromagnetic wheel.

10. The method of claim 8 further comprising:
forming the grooved ferromagnetic wheel by forming alternating wheel grooved portions and wheel raised portions, such that the magnet interacts at alternating levels of magnetic attraction with the grooved ferromagnetic wheel during rotation adjacent to the magnet to generate the haptic feedback when the scroll wheel is rotated by a user.

11. The method of claim 8 further comprising:
operatively coupling a wireless mouse radio to the mouse microcontroller to wirelessly transmit scrolling input data from the angular motion encoding sensor of the haptic magnetic encoder to an information handling system.

12. The method of claim 8, wherein the grooved ferromagnetic wheel comprises a silicone steel.

13. The method of claim 8, wherein the magnet includes an electromagnet operatively coupled to the PMU to selectively activate the electromagnet during operation of the magnetic haptic encoder.

14. A mouse for use with an information handling system comprising:
a base chassis of the mouse to enclose a mouse microcontroller and a mouse power management unit (PMU) to power the mouse microcontroller;
a scroll wheel to receive scrolling input from a user by rotating the scroll wheel;
the scroll wheel operatively coupled to a magnetic haptic encoder to detect a scrolling input signal from rotation of the scroll wheel;
the magnetic haptic encoder comprising:
a grooved ferromagnetic wheel, the grooved ferromagnetic wheel comprising alternating wheel grooved portions and wheel raised portions;
an angular motion encoding sensor in a housing of the magnetic haptic encoder to encode rotation of the scroll wheel; and
a magnet operatively coupled to the housing of the magnetic haptic encoder adjacent to a face of the grooved ferromagnetic wheel such that rotation of the grooved ferromagnetic wheel rotates adjacent to the face of the alternating wheel grooved portions and wheel raised portions and magnet fluctuating magnetic attraction between the magnet and the rotating grooved ferromagnetic wheel to generate haptic feedback at the scroll wheel to the user; and
a top housing operatively coupled to the base chassis of the mouse to enclose the mouse.

15. The mouse of claim 14, wherein the alternating wheel grooved portions and wheel raised portions create alternating levels of magnetic attraction with the magnet due to the wheel raised portions passing through a magnetic field of the magnet closer than the grooved portions of the grooved ferromagnetic wheel to magnetically generate the haptic feedback.

16. The mouse of claim 14 further comprising:
a magnet sleeve to hold the magnet, wherein the magnet within the magnet sleeve is held on a housing of the magnetic haptic encoder adjacent to the alternating wheel grooved portions and wheel raised portions of the rotating grooved ferromagnetic wheel.

17. The mouse of claim 14 further comprising:
the magnetic haptic encoder operatively coupled to the mouse microcontroller to receive the scrolling input signals indicative of the changes in an angular position of the scroll wheel and transmit those scrolling input signals to the information handling system.

18. The mouse of claim 14 further comprising:
an encoder shaft operatively coupling the scroll wheel to the grooved ferromagnetic wheel of the magnetic haptic encoder, where the encoder shaft rotates the ferromagnetic wheel when the scroll wheel is rotated.

19. The mouse of claim 14 further comprising:
the magnet includes a permanent magnet.

20. The mouse of claim 14 wherein the grooved ferromagnetic wheel comprises a silicone steel.

* * * * *